United States Patent [19]
Koizumi et al.

[11] Patent Number: 5,650,895
[45] Date of Patent: Jul. 22, 1997

[54] ENCLOSURE STRUCTURE FOR MAGNETIC DISK MEMORY DEVICE

[75] Inventors: Yuichi Koizumi, Kanagawa-ken; Shohei Honda, Hiratsuka; Atsushi Ito, Kanagawa-ken; Yoshihiko Kinoshita; Nobuyuki Okunaga, both of Odawara, all of Japan

[73] Assignee: Hitachi, Ltd., Tokyo, Japan

[21] Appl. No.: 263,330

[22] Filed: Jun. 21, 1994

[30] Foreign Application Priority Data

Jun. 22, 1993 [JP] Japan .................... 5-150746

[51] Int. Cl.⁶ .................... G11B 33/14; G11B 5/55
[52] U.S. Cl. .................... 360/106; 360/97.03
[58] Field of Search .................... 360/70, 97.01, 360/105, 97.02, 97.03, 106

[56] References Cited

U.S. PATENT DOCUMENTS

| | | | |
|---|---|---|---|
| 4,818,097 | 4/1989 | Shirotori | 360/97.02 |
| 5,235,481 | 8/1993 | Kamo et al. | 360/97.01 |
| 5,299,083 | 3/1994 | Kawada | 360/106 |
| 5,379,171 | 1/1995 | Morehouse et al. | 360/105 |
| 5,379,439 | 1/1995 | Harrison et al. | 364/248 |

FOREIGN PATENT DOCUMENTS

| | | |
|---|---|---|
| 386982 | 4/1991 | Japan . |
| 3189958 | 8/1991 | Japan . |
| 3189957 | 8/1991 | Japan . |
| 3286488 | 12/1991 | Japan . |
| 479092 | 3/1992 | Japan . |

*Primary Examiner*—Aristotelis M. Psitos
*Assistant Examiner*—Regina Y. Neal
*Attorney, Agent, or Firm*—Kenyon & Kenyon

[57] ABSTRACT

In a closed housing of a magnetic disk memory device are accommodated a spindle motor for rotatably holding a magnetic disk medium for storage of information, a magnetic head for recording and reproducing information into and from the magnetic disk medium, a head positioning mechanism for moving the magnetic head to any position on the magnetic disk medium, and so forth. A printed board having thereon control circuit parts for controlling the spindle motor and the head positioning mechanism and recording/reproducing circuit parts for effecting the recording/reproduction by the magnetic head is arranged outside of the housing. An opening corresponding to a component of the magnetic disk memory device is formed in a certain region of the housing opposing the printed board. A shielding member for preventing a dust from entering into the housing is provided for the opening. The shielding member has a sheet-like or cup-like form and the device is constructed corresponding to the unevenness or uneven arrangement of components, thereby making it possible to reduce the thickness of the device. The commonization of the shielding member for disk devices is possible and a distance between a printed board and the housing can be reduced for the whole of the device.

20 Claims, 8 Drawing Sheets

ENCLOSURE STRUCTURE FOR MAGNETIC DISK MEMORY DEVICE

BACKGROUND OF THE INVENTION

The present invention relates to a magnetic disk memory device, and more particularly to a magnetic disk memory device having an improved housing.

Generally, the components or constituent elements of a magnetic disk memory device include a spindle motor which supports and rotates a magnetic disk for recording information, a positioning mechanism which supports a magnetic head for reading and writing information from and to the magnetic disk and causes the movement of the magnetic head on the magnetic disk so that the head moves to any position on the disk in cooperation with the rotation of the disk. These components are incorporated in a housing. In such a magnetic disk memory device, the recording and reproduction are made in a state in which the magnetic head takes a very low floating condition. Therefore, even a small amount of dust should be prevented from entering into the housing. Accordingly, the housing is placed in a substantially closed condition. Also, there is generally known a magnetic disk memory device having a structure in which a printed wiring board including a control circuit for causing a magnetic head to perform the writing into a magnetic disk and the reading from the magnetic disk and a circuit for controlling the operation of a spindle motor and a motor included in a head positioning mechanism are mounted on the outer side of a housing.

In recent years, a reduction in thickness or size was required for such magnetic disk memories. The size shows a yearly decrease. The conventional approach to the reduction in thickness is made by improving constituent elements included in a housing.

JP-A-3-189957 has disclosed a spindle motor the height of which is made smaller than that of the conventional spindle motor. The disclosed spindle motor is constructed such that only one end of a spindle is fixed to a housing and a hub is attached to the spindle through a bearing so that a motor coil and a magnet are incorporated in the hub and a printed wiring board for the spindle motor is brought into the hub. Also, JP-A-3-189958 has disclosed a magnetic disk memory device in which a member including a hub and a spindle incorporated in one is used in order to make the height of a spindle motor smaller than that of the conventional spindle motor. In the disclosed magnetic disk memory device, the influence of the spindle motor given on the height of a housing is diminished in such a manner that the housing for holding the spindle through a bearing is fixed in a hole provided in a base portion of the magnetic disk memory device. In these prior arts, the reduction in device thickness is attained by making the improvement in which the height of a constituent element included in a housing is reduced.

As a further technique for reduction in thickness of a magnetic disk memory device, JP-A-4-79092 has disclosed a technique in which the inner wall surface of a housing of a so-called FDD (floppy disk drive) having a flexible magnetic disk as a recording or storage medium is processed in order to acquire the substantial height of the interior of the housing. In this prior art, the housing is composed of a base portion and a cover portion and a recess is formed on the inner wall of the cover portion by press working.

JP-A-3-286488 has disclosed a technique concerning the connection of a spindle motor which is included in a closed housing and a printed wiring board which is arranged outside of the housing and on which a circuit for controlling the spindle motor is placed. The thickness of the whole of a device is substantially determined by the thickness of the housing and a distance between the housing and the printed wiring board provided outside of the housing. In the disclosed technique, the distance between the printed wiring board and the housing is reduced in such a manner that a connector for electrically connecting the spindle motor and the control circuit on the printed wiring board is provided in the wall of the housing.

However, since the reduction in size of mechanism elements such as a spindle motor and the reduction in thickness of a printed wiring board have a direct relation with the performance, a further reduction in size and thickness is considerably difficult. Also, the reduction in thickness of a housing has a limit since the housing is formed by a casting such as a die-cast. Regarding the structure of the housing, even if only a part of the specification is changed, that is, even if electronic parts on the printed wiring board are changed, a strength required for the housing must be newly considered or the housing must be fabricated again. Therefore, the realization of reduction in housing thickness has a very poor efficiency.

Accordingly, the formation of the recess in the inner wall surface of the housing contributes to no considerable acquisition of the height of the interior of the housing and has a very low degree of freedom for a change in design specification. Also, even with the construction in which the connecting portion of the connector is provided in the inner wall surface of the housing, the degree of freedom for the change in design specification is very small.

SUMMARY OF THE INVENTION

An object of the present invention is to provide an improved magnetic disk memory device the height of which can be further reduced and which can cope with a change in printed wiring board, spindle motor and so forth.

To attain the above object, a magnetic disk memory device, to which the present invention is applied, comprises a disk driving mechanism which supports and rotates a magnetic disk, a positioning mechanism which supports a magnetic head for reading information from the magnetic disk and causes the movement of the magnetic head to any position on the magnetic disk, a closed housing which accommodates these components therein, and a printed wiring board on which electric circuits for controlling the disk driving mechanism and the positioning mechanism, and so forth are placed. The printed wiring board and the housing are assembled in an integral construction. The circuits on the printed wiring board and the components in the housing are electrically connected. At least one opening is formed in at least a surface of the housing opposing the printed wiring board. A shielding member for closing or sealing the housing is provided in the opening. A part of at least one of components included in the magnetic disk memory device is received or accommodated in a space formed by the opening and the shielding member.

The opening is arranged, for example, at a position on the housing corresponding to a component arranged outside of the housing or in the housing. A proper shielding member is provided in accordance with a relative position of a part of the component in the magnetic disk memory device for the wall of the housing. The proper shielding member is a member which has a form conformable to the opening and has a depth projecting toward the inside or outside of the housing in accordance with the relative position, or a sheet-like member. With the opening and the shielding member according to the present invention, since a component projecting from the interior of the housing or projected electronic parts or the like on the printed wiring board can be effectively accommodated, it is possible to reduce the thickness of the magnetic disk memory device (or the thickness of the closed housing and a distance to the fixed wiring board).

More particularly, the device can be constructed such that a housing opening is provided for a part of a spindle motor in the disk driving mechanism, a part of an actuator in the head positioning mechanism, or electronic parts on the printed wiring board so that it is effectively accommodated in the housing in accordance with a relative position of the component for the wall of the housing.

Also, it is possible to reduce the height of the whole of the device by opening the whole upper surface of the housing having therein the disk driving mechanism, the head positioning mechanism, and so forth and providing a sheet-like shielding member for the opened surface.

Accordingly, the device thickness is reduced by at least a thickness associated with the depth of the space formed outside of the housing or in the housing by the opening and the shielding member. The device thickness changes depending on the form or configuration of the shielding member, particularly, the depth thereof from the opening. For example, in the case where the shielding member is formed by a flat thin plate, the device thickness in the surfaces of the housing and the printed wiring board opposing each other can be reduced down to the thickness of the wall of the housing at greatest. Also, in the case where the shielding member has a projecting portion passing through the opening to extend to the outside of the housing or the inside of the housing or is a cup-shaped member extending from the opening to the projecting portion and components arranged in the housing or outside of the housing are accommodated by a space formed by the opening and the shielding member, the device thickness can be reduced by a thickness associated with the sum of the opening and the depth of the cup at greatest. In this case, when a space which is not occupied by components exists in the inward direction or outward direction of the housing having the cup-shaped shielding member, the further accommodation of components arranged in the housing or outside of the housing can be made positively, thereby making it possible to reduce the device thickness.

The present inventors have paid attention to the fact that a housing for accommodating main components of a magnetic disk memory device such as a disk includes a portion where a strength for holding the main components is required and a portion where the strength is not required. In the present invention, an opening is provided in the portion of the housing where the strength is not very required, and the opening is sealed or closed by a shielding member which may be a sheet-like member. In order to realize a high recording density, a very degree of cleanliness is required for the interior of the housing. Accordingly, if there are provided a structure, materials and mounting means which are enough to attain the required degree of cleanliness, it is possible to attain a shielding member for realizing the present invention and a magnetic disk memory device which includes such a shielding member. The shielding member capable of being used in the present invention may be a flat thin plate, film, foil or the like made of a synthetic resin or the like, or a sheet-like or cup-like member made of a metal material such as aluminum which can be easily fabricated or processed. However, the material is not limited to those examples. Another material may be used with no problem so long as it can hold the closeness of the housing.

Since the shielding member is light in weight, it is fixed by means of a binding or adhesive agent or the like in an extent with which the cleanliness of the interior of the housing can be maintained. The fixing method includes a method in which the shielding member is fixed by an adhesive sheet used as the adhesive agent or a method in which a stepped portion to be jointed to the shielding member is provided at the periphery of the opening provided in the housing and the stepped portion of the housing and the shielding member are fixed to each other through an adhesive agent. In the case where the strength of fixation is not sufficient, it is effective to join the shielding member to a supporting member for supporting the shielding member.

It does not always follow that electronic parts on a printed wiring board are fixed in a state in which they have been subjected to a perfect insulating treatment. Therefore, if the electronic parts become conductive for the housing, a trouble may be occur in the circuit operation. Accordingly, it is effective to provide means such as an insulating sheet between the printed board and the housing. Also, in the case where the shielding member is made by an insulating material or has an electrical insulating layer formed on a surface thereof, there is no need to consider an arrangement with which electronic parts or electrically active portions provided on the printed wiring board are prevented from contacting the shielding member so that they become conductive.

According to the magnetic disk memory device of the present invention, it is possible not only to further reduce the thickness of the device but also to cope with a change in specification without increasing the thickness, thereby reducing the fabrication and assembly cost.

BRIEF DESCRIPTION OF THE DRAWINGS

The present invention will be described in conjunction with certain drawings which are the purpose of illustrating the preferred and alternate embodiments of the invention only, and not for the purposes of limiting the same, and wherein.

DESCRIPTION OF THE PREFERRED EMBODIMENTS

Embodiments of a magnetic disk memory device of the present invention will now be described by virtue of the accompanying drawings.

Figure 1:
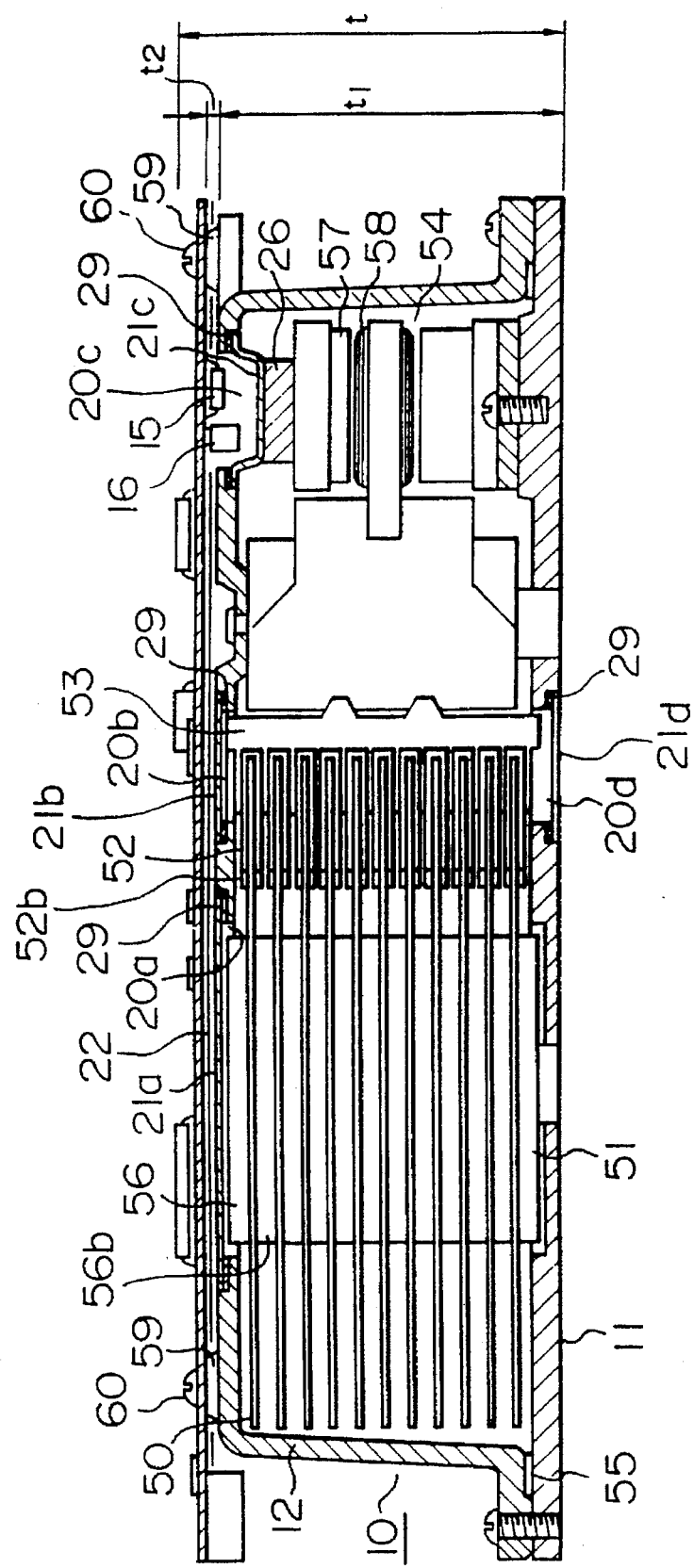
FIG. 1 is a cross section showing an embodiment of a magnetic disk memory device according to the present invention.

FIG. 1 is a cross section showing an embodiment of a magnetic disk memory device to which the present invention is applied.

The magnetic disk memory device includes a housing 10 which is capable of being closed in order to maintain the cleanliness. In the housing 10 are provided a magnetic disk 50 as a magnetic storage medium, a spindle motor 51 for supporting and rotating the magnetic disk 50, a magnetic head 52b for reading information from the magnetic disk 50, and a head positioning mechanism for bringing the magnetic head 52b to any position on the magnetic disk 50.

The head positioning mechanism is composed of a head assembly 52 having a suspension arm for fixing the magnetic head 52b at an end portion, a swing arm 53 for supporting the head assembly 52 and causing the movement of the head assembly 52 on the magnetic disk 50, and a voice coil motor 54. The positioning of the magnetic head 52b is made in such a manner that the movement of a coil 58 in the voice coil motor 54 causes the rotation of the swing arm 53 so that the magnetic head 52b is brought into any position on the magnetic disk 50.

At an upper portion of the closed housing 10 is provided a printed wiring board 15 by machine screws 60 or the like through an insulating member 22 and spacers 59. The printed wiring board 15 includes a circuit for causing the magnetic head to perform the writing into the magnetic disk and the reading from the magnetic disk, a circuit for controlling the operation of the spindle motor and the voice coil motor 54 included in the head positioning mechanism, and so forth. These circuits are electrically connected to the head, the spindle motor 51 and the voice coil motor 54 which are provided in the housing 10.

The housing 10 is composed of a base 11 and a cover 12. The base 11 has a substantially plate-like form and is formed by, for example, an aluminum die-cast. The base 11 is provided with seats for installing the spindle motor and the head positioning mechanism thereon. The cover 12 is also formed by an aluminum die-cast but has a hollow box form with one surface opened. The cover 12 covers the components on the base 11 through a gasket 55 so as to contain them. A flange portion of the cover 12 is fastened to the base 11 by bolts.

A surface of the cover 12 opposing the printed wiring board 15 has some openings which include an opening 20a provided at a position corresponding to an upper portion of the spindle motor 51, an opening 20b provided at a position corresponding to an upper portion of the swing arm 53 forming the head positioning mechanism, and an opening 20c provided at a position corresponding to an upper portion of the voice coil motor 54. The openings 20a, 20b and 20c are covered with shielding members 21a, 21b and 21c, respectively.

Each of the shielding members 21a and 21b for the openings 20a and 20b has a thin plate form. The shielding member 21a or 21b falls in a stepped portion formed around the opening 20a or 20b in the cover 12 and is fixed to the cover 12 by use of an adhesive agent 29. The shielding member 21c for the opening 20c is made of a synthetic resin molding configured into a shallow box form with a flange portion provided at an opened end portion. The box portion of the shielding member 21c is fitted from the interior of the housing into a stepped portion formed around the opening of the cover 12 and the flange portion thereof is fixed to the cover 12 by use of an adhesive agent 29.

The base 11 is provided with an opening 20d at a position corresponding to a lower portion of the swing arm 53. The opening 20d is covered with a shielding member 21d which has a thin plate form. The shielding member 21d is fitted into a stepped portion formed around the opening 20d of the base 11 and is fixed to the base 11 by an adhesive agent 29.

A clamp 56 existing on an upper portion of the spindle motor 51 fixes the magnetic disk 50 with the intervention of spacers 56b. The clamp 56 is positioned inside of the opening 20a. The head positioning mechanism is positioned such that the respective parts of the upper and lower portions of the swing arm 53 forming the head positioning mechanism are positioned inside of the openings 20b and 20d. With such a design in which the member is arranged inside of the opening, the thickness $t_1$ of the housing can be made small, thereby reducing the thickness t of the device.

A permanent magnet 57 forming the voice coil motor 54 is fixed by fixing means which is not shown. A cushioning member 26 is provided for absorbing the vibration of the permanent magnet 57 based on a reaction force generated upon movement of the coil 58 so that the vibration is not transmitted to the head assembly 52. The printed wiring board 15 is arranged on the cover 12 so that tall electronic parts 16 are mounted on the substrate of the board 15 corresponding to the opening 20c and is accommodated in the hollow of the shielding member 21c. Since the shielding member 21c is made of a synthetic resin and is in an isolated condition for the electronic parts 16, it gives no influence on the operation of the electronic parts 16. With such a construction, a distance $t_2$ between the printed wiring board 15 and the cover 12 is made small, thereby further reducing the device thickness t.

Next, more detailed explanation will be made of the openings and the shielding members.

The closed housing of the magnetic disk memory device according to the present invention is provided with the opening covered with the shielding member.

Figure 2:
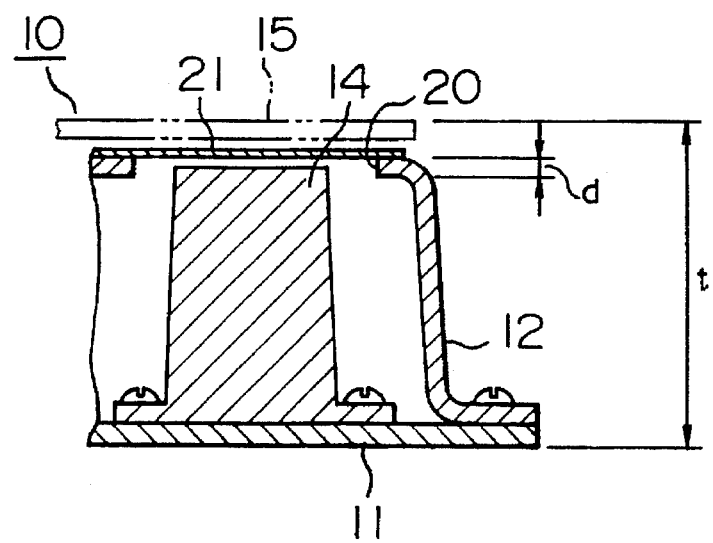
FIG. 2 is a schematic view showing one mounting state in the magnetic disk memory device of the present invention.

In FIG. 2, a shielding member 21 closing an opening 20 includes a flat thin plate, film or foil which may be made of a metal material or synthetic resin. Examples of a specific material include aluminum, copper, polyester resin, engineer plastic, fine chemical film, and so forth.

The opening 20 is provided in the cover 12 corresponding to a component 14 mounted in the interior of the housing, for example, the voice coil motor 14 included in the head positioning mechanism. This also holds for the spindle motor. In the shown embodiment, a part of the voice coil motor 14 is accommodated in the interior of the opening 20. The shielding member 21 is arranged to cover the opening 20 from the outer side of the cover 12 and the periphery of the shielding member 21 is fixed to the cover 12 by an adhesive agent or the like, thereby preventing a dust or the like from entering into the housing. A printed wiring board 15 including a circuit for controlling the operation of the voice coil motor 14 is arranged on the outer side of the cover 12 and is fixed to the same.

With the housing 10 having the opening 20 and the shielding member 21 mentioned above, since a part of a component existing in the housing is arranged in the interior of the opening 20 so that the thickness of the housing 10 is reduced by the depth d of the opening, it is possible to reduce the thickness t of the whole of the magnetic disk memory device.

Figure 3:
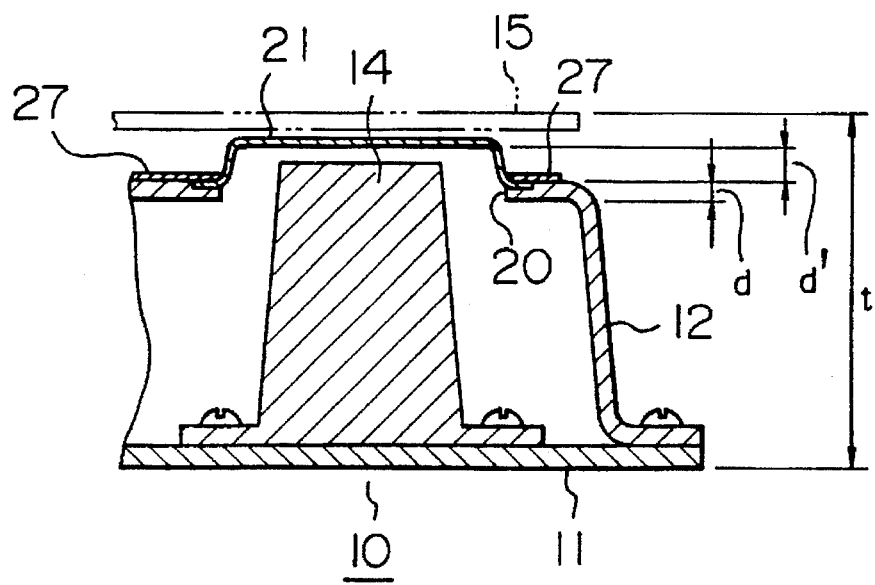
FIG. 3 is a schematic view showing another mounting state in the magnetic disk memory-device of the present invention.

FIG. 3 shows another construction in which the device thickness is reduced by accommodating a component included in the housing. In FIG. 3, a shielding member 21 has a form conformable to an opening 20 and is formed such that a part or the whole thereof projects toward the exterior of a housing. A part of a component arranged in the housing is accommodated in the space of the shielding member 21 which is formed by the projection.

The shielding member 21 includes a thin metal plate or a synthetic resin molding and is shaped into a shallow box form which has a flange portion at an opened end thereof. The shielding member 21 is attached to a cover 12 by fitting the box portion onto the opening 20 from the exterior of the cover 12 and fixing the flange portion to the cover 12. For example, if the component 14 in the housing is a spindle motor, an upper end of the spindle motor passes through the opening 20 so that it is accommodated in the space of the box portion of the shielding member 21.

With the housing 10 having the opening 20 and the shielding member 21 mentioned above, the thickness of the housing 10 is reduced by a thickness associated with the sum of the depth d of the opening 20 and the depth d' of the box portion of the shielding member 21. The thickness t of the device is increased since the shielding member 21 projects from the upper surface of the housing 10. However, even if a tall component is mounted in the housing 10, the device thickness t can be reduced by arranging the shielding member 21 in a space between a printed wiring board 15 and the cover 12 where electronic parts are not mounted on the printed wiring board 15, by arranging the shielding member 21 at a position apart from the printed wiring board 15, or by providing the printed wiring board 15 with a hole through which the box portion of the shielding member 21 passes.

In the next embodiment of the magnetic disk memory device according to the present invention, a part of a component arranged outside of a housing (for example, electronic parts mounted on a printed wiring board) is positioned in an opening provided in the housing so that it is accommodated in the housing through a shielding member. The housing is closed by the shielding member which covers the opening.

Figure 4:
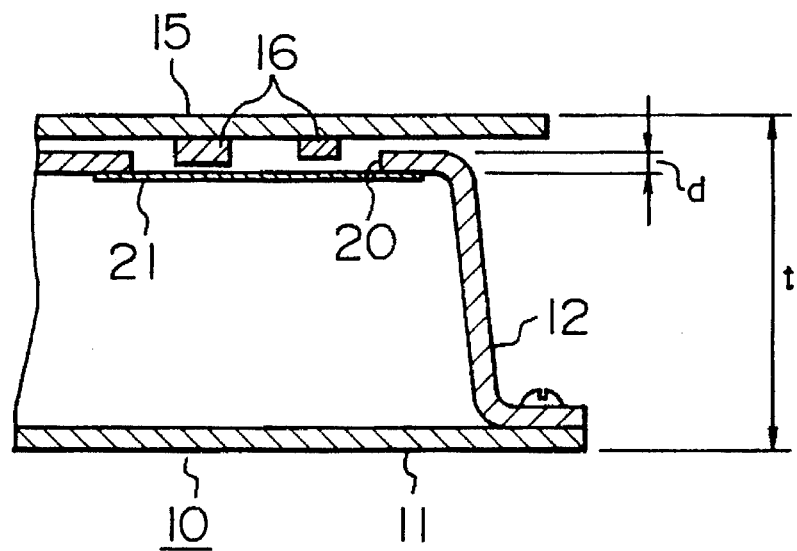
FIG. 4 is a schematic view showing a still other mounting state in the magnetic disk memory device of the present invention.

As shown in FIG. 4, an opening 20 is provided at a position corresponding to electronic parts 16 mounted on a printed wiring board 15. A shielding member 21 includes a flat thin plate, film or foil which may be made of a metal material such as aluminum or a synthetic resin. The shielding member 21 is arranged to cover the opening 20 and the periphery of the shielding member 21 is fixed to a cover 12 by an adhesive agent or the like, thereby preventing a dust or the like from entering into a housing 10. With the housing 10 having the opening 20 and the shielding member 21 mentioned above, the electronic parts 16 mounted projecting from the printed wiring board 15 can be accommodated in the opening 20 provided in the housing 10. Thereby, it is possible to reduce a distance between the printed wiring board 15 and the housing 10 by the depth d of the opening 20. As a result, the device thickness t can be reduced.

Figure 5:
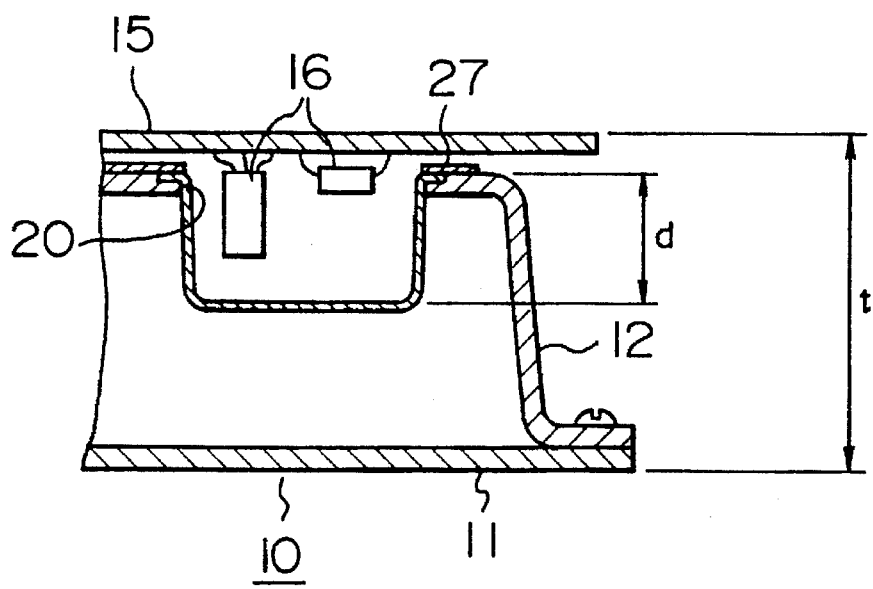
FIG. 5 is a schematic view showing a further mounting state in the magnetic disk memory device of the present invention.

If a shielding member is shaped into a form which projects toward the inner space of a housing, as shown in FIG. 5, it becomes possible to further accommodate a component arranged outside of the housing, for example, electronic parts mounted on a printed wiring board.

Figure 6:
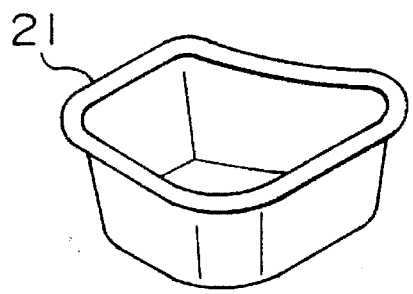
FIG. 6 is a perspective view of a shielding member 21 shown in FIG. 5.

A shielding member 21 includes a thin metal plate or a molding made of a synthetic resin or the like and is shaped into a shallow box form which has a flange portion at an opened end thereof, as shown in FIG. 6. The shielding member 21 is attached to a cover 12 by fitting the box portion into the opening 20 from the exterior of the cover 12 and fixing the flange portion to the cover 12, as shown in FIG. 5. A printed wiring board 15 is arranged for the cover 12 and fixed thereto so that electronic parts mounted on the printed wiring board 15 are positioned in the inner space of the shielding member 21.

With the housing 10 having the opening 20 and the shielding member 21 mentioned above, a distance between the printed wiring board 15 and the cover 12 is reduced by a distance associated with the depth d' of the box portion of the shielding member 21. As a result, it is possible to reduce the device thickness t.

Figure 7:
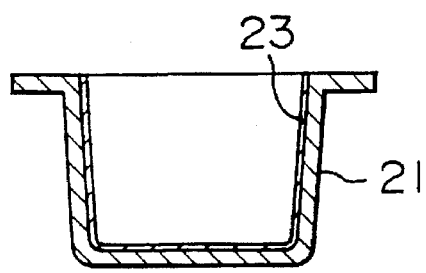
FIG. 7 is a cross section view of the shielding member 21 shown in FIG. 5.

In the present invention, the shielding member 21 with a flat form explained in conjunction with FIGS. 2 and 4 may include the lamination of an insulating film and a conductive plate through a pressure sensitive adhesive or binding agent, and the shielding member 21 explained in conjunction with FIGS. 3, 5 and 6 may have an electrical insulating material layer 23 formed on a surface thereof, as shown in FIG. 7. Such a construction is free of the influence of noises and has no need to arrange electronic parts with isolation being taken into consideration. In the case where the whole of the shielding member 21 is formed by a synthetic resin molding, it is not necessary to arrange electronic parts or electrically active portions on the printed wiring board so that they do not contact the shielding member 21. According to the present invention, it is possible to further reduce the device thickness t. Also, it is possible to easily make the design and the packaging or mounting. Further, it is possible to reduce the parts cost and the assembly cost.

Figure 8:
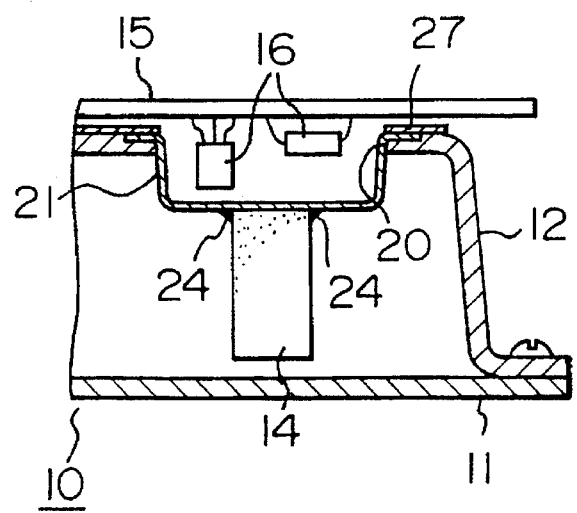
FIG. 8 is a schematic view showing a still further mounting state in the magnetic disk memory device of the present invention.
Figure 9:
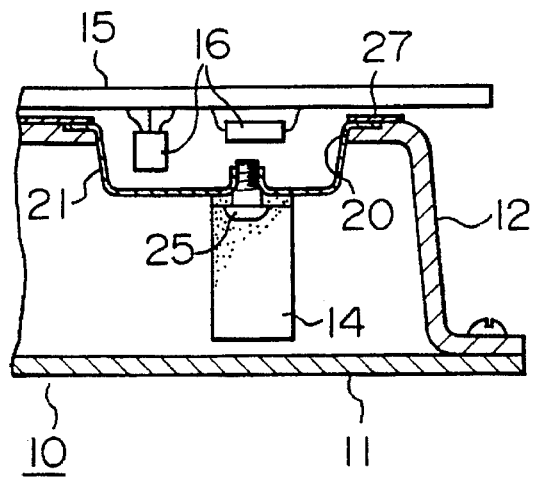
FIG. 9 is a schematic view showing a furthermore mounting state in the magnetic disk memory device of the present invention.

The shielding member 21 can be constructed not only to accommodate electronic parts on a printed wiring board but also to provide a support for a component included in a housing 10. In this case, it is not necessary to change the forms of a base 11 and a cover 12 for each kind of device or the housing can be commonized. The support has a function of assisting the fixation of the component. As shown in FIG. 8, a shielding member 21 may be coupled or bound to a component 14 incorporated in a housing 10 by an adhesive agent 24. Also, as shown in FIG. 9, a shielding member 21 may be coupled to a component 14 incorporated in a housing 10 in such a manner that a hole is provided at a portion of the shielding member 21 positioned in the housing 10 by burring, a female screw is formed in the hole and the shielding member 21 is coupled to the component 14 by a small screw or bolt 25. In this case, it is required that the shielding member has a strength enough to hold the small screw or bolt 25. This requirement can be satisfied by using a metal material as the material of the shielding member or by using a structure which provides an enhanced strength. In the case where the component 14 is to be used as a support, a distance between the base 11 and the component 14 is made narrower than that shown in FIG. 8 or 9.

Figure 10:
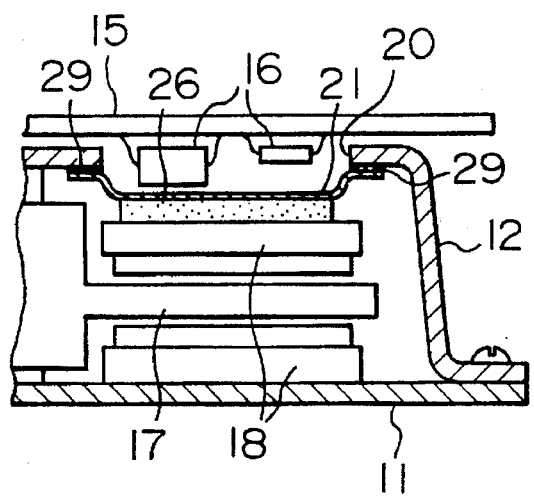
FIG. 10 is a schematic view showing a still furthermore mounting state in the magnetic disk memory device of the present invention.

As shown in FIG. 1 and explained in conjunction with FIG. 1, the shielding member 21 may be provided with a cushioning member 26, as shown in FIG. 10. The cushioning member 26 may be made of rubber or resin foam. The cushioning member 26 contacts a component 14 incorporated in a housing 10. Particularly, in the case where the cushioning member 26 is applied to the magnet of the voice coil motor included in the head positioning mechanism, it is possible to improve the precision of head positioning. Namely, the positioning of the magnetic head by the voice coil motor is performed by controlling a current flowing through the coil 58 provided in a magnetic field generated by the magnet 18 in order to provide a rotating force to the swing arm which supports the magnetic head. The magnet 18 vibrates by a reaction force generated when the swing arm rotates. This vibration may be transmitted to the swing arm 17 through the housing 10. However, if the magnet 18 of the voice coil motor is in contact with the cushioning member 26, the cushioning member 26 attenuates or absorbs the vibration of the voice coil motor, thereby preventing the vibration from being transmitted to the swing arm 17. Therefore, it is possible to improve the precision of positioning of the head.

Figure 11:
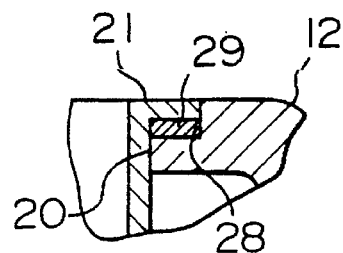
FIG. 11 is a cross section showing the jointed state of a shielding member 21.

As apparent from FIGS. 3, 5, 8 and 9, the attachment of such a shielding member 21 to the housing 10 can be realized by providing in a sheet 27 a cut corresponding to the opening 20 and the opened portion of the box form of the shielding member 21, and covering the cover 12 with the sheet 27 to bind the sheet to the cover 12 and the shielding member 21. But, as shown in FIG. 11, there is also effective a method in which a flange portion of the shielding member 21 is fitted to a stepped portion 28 of the cover 12 provided around the opening 20 and the flange portion of the shielding member 21 and the cover 12 are bound to each other by an adhesive agent 29.

In the former case, the sheet 27 can serve for a sheet for effecting electrical isolation between the printed wiring board 15 and the cover 12 or the base 11. Thereby, it is possible to reduce the number of parts and to improve the assembling workability. In the latter case, referring to FIG. 11, since no unevenness appears on the surface of the cover 12 by virtue of the stepped portion 28 when the shielding member 21 is fitted into the opening 20, it is possible to cause the printed wiring board 15 to come nearer to the cover 12 as compared with the case where no stepped portion 28 is provided.

According to the present invention, a magnetic disk memory device as shown in FIG. 1 can be obtained in which the housing 10 is provided with one set of the opening 20 and the shielding member 21 mentioned above or a plural sets thereof so that components included inside and outside of the housing are packaged with a high density, thereby reducing the thickness of the housing and hence the thickness t of the whole of the device. Also, even if the construction of a printed wiring board is different, for example, even if the arrangement of electronic parts is different, the electronic parts can be arranged or accommodated in the interior of the opening 20 or the hollow of the shielding member 21 associated with the opening 20, thereby making it possible to flexibly cope with a change in specification without increasing the thickness t of the device inclusive of the printed wiring board.

Figure 12:
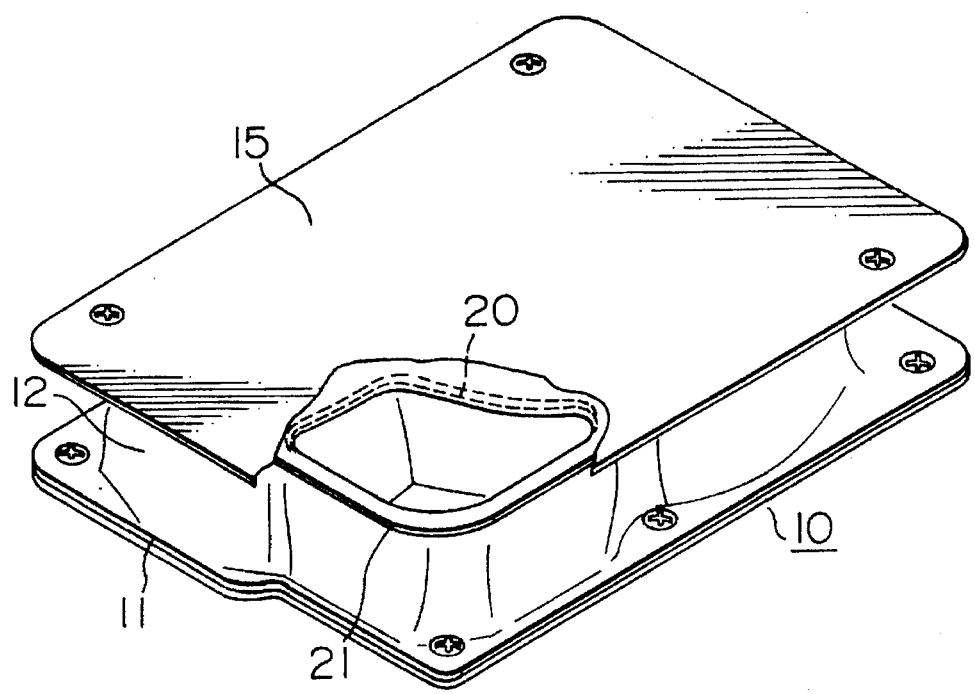
FIG. 12 is a partially broken perspective view showing another embodiment of the magnetic disk memory device of the present invention.

FIG. 12 shows a magnetic disk memory device according to another embodiment of the present invention. In the magnetic disk memory device shown in FIG. 12, a housing 10 is provided with openings corresponding to a spindle motor and a head positioning mechanism as in the magnetic disk memory device explained in conjunction with FIG. 1 and a cover 12 is provided with an opening 20 at a portion corresponding to a space which is not occupied by components incorporated in the housing 10.

Figure 13:
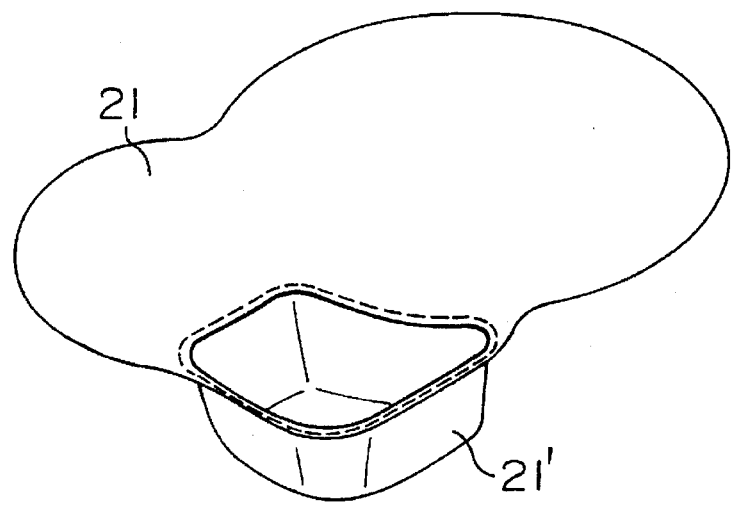
FIG. 13 is a perspective view of a shielding member 21 shown in FIG. 12.

As shown in FIG. 13, a shielding member 21 has a form and a size which cover the whole of side faces provided with the forms of the openings of the cover 12 corresponding to the spindle motor and the head positioning mechanism and further has a portion 21' which projects toward the housing 10 in a region associated with the opening 20. The shielding member is made by the deep drawing press of a metal such as aluminum and has an electrical insulating layer formed an outer surface thereof. The attachment of the shielding member 21 to the cover 12 is made by fitting the projecting portion 21' into the opening 20 and fixing at least the periphery of the shielding member 21 to the cover 12 by use of an adhesive agent. The shielding member 21 shown in FIG. 3 can be formed with an integral or monobloc structure having a plurality of projecting portions 21'.

With such a magnetic disk memory device, a multiplicity of openings can be closed by one shielding member at once. Therefore, it is possible to improve the assembling workability. Also, even if relatively tall electronic parts are mounted on a printed wiring board 15, it can be arranged at a position corresponding to the opening 20, thereby making it possible to flexibly cope with a change in specification of an electric circuit without increasing the thickness t of the whole of the device. Further, by forming an electrical insulating material layer on the surface of the shielding member 21, it becomes unnecessary to arrange electronic parts or electrically active portions in the printed wiring board 15 with isolation taken into consideration. As a result, it is possible to easily make the design and the packaging or mounting.

Figure 14:
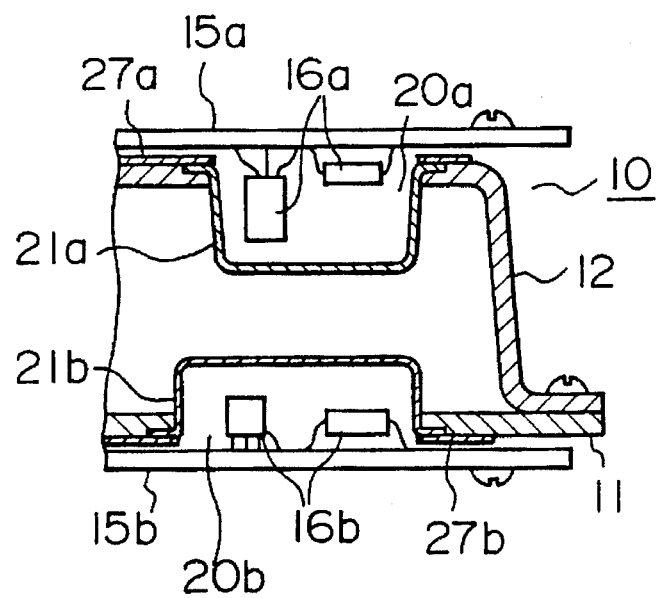
FIG. 14 is a cross section showing a moreover mounting state in the magnetic disk memory device of the present invention.

FIG. 14 shows a magnetic disk memory device according to a further embodiment of the present invention. In the present embodiment, components incorporated in a housing 10 are similar to those in the device shown in FIG. 1 but two printed wiring boards 15a and 15b are arranged on the opposite sides of the housing. A cover 12 has an opening 20a at a portion corresponding to a space of the housing 10 which is not occupied by components. Also, a base 11 has an opening 20b at a substantially coaxial position for the opening 20a.

Each of shielding members 21a and 21b covering the openings 20a and 20b has a configuration approximately conformable to the opening and is shaped into a shallow box form having a flange portion at an opened end thereof. The shielding member includes a formed metal member or a synthetic resin molding. The shielding members 21a and 21b are fitted in the openings 20a and 20b provided in the base 11 and the cover 12, respectively. In the case of the formed metal member, an electrical insulating layer is provided on a surface opposite to the electronic parts 16a or 16b. To shield the opening 20a or 20b or to fix the shielding member 21a or 21b associated with the opening, a sheet 27a or 27b having cuts with forms associated with the opening 20a or 20b and the opened portion of the box form is bound to the cover 12 and the flange portion of the shielding member 21a or to the base 11 and the flange portion of the shielding member 21b. In the case where a stepped portion is provided around the opening 20a or 20b, the flange portion of the shielding member 21a or 21b is fitted in the stepped portion provided around the opening 20a or 20b and is thereafter fixed to the cover 12 or the base 11 by use of an adhesive agent. On the substrate of the printed wiring board 15a or 15b are mounted tall electronic parts 16a or 16b at a position corresponding to the opening 20a or 20b of the housing 10. The printed wiring board 15a or 15b is fixed to the cover 12 or the base 11 in a state in which the electronic parts 16a or 16b are fitted in the hollow of the shielding member 21a or 21b.

With such a magnetic disk memory device, since the electronic parts 16a and 16b mounted on the printed wiring boards 15a and 15b are accommodated in the interiors of the shielding members 21a and 21b, it is possible to reduce a distance between the printed wiring board 15a and the cover and a distance between the printed wiring board 15b and the housing 10. Therefore, even in the case where the printed wiring boards 15a and 15b are arranged on the opposite sides of the housing 10, it is possible to reduce the thickness t of the device. As a result, the mounting or packaging of printed wiring boards based on a change in specification can be made easily as in the case of the magnetic disk memory device shown in FIG. 1.

Figure 15:
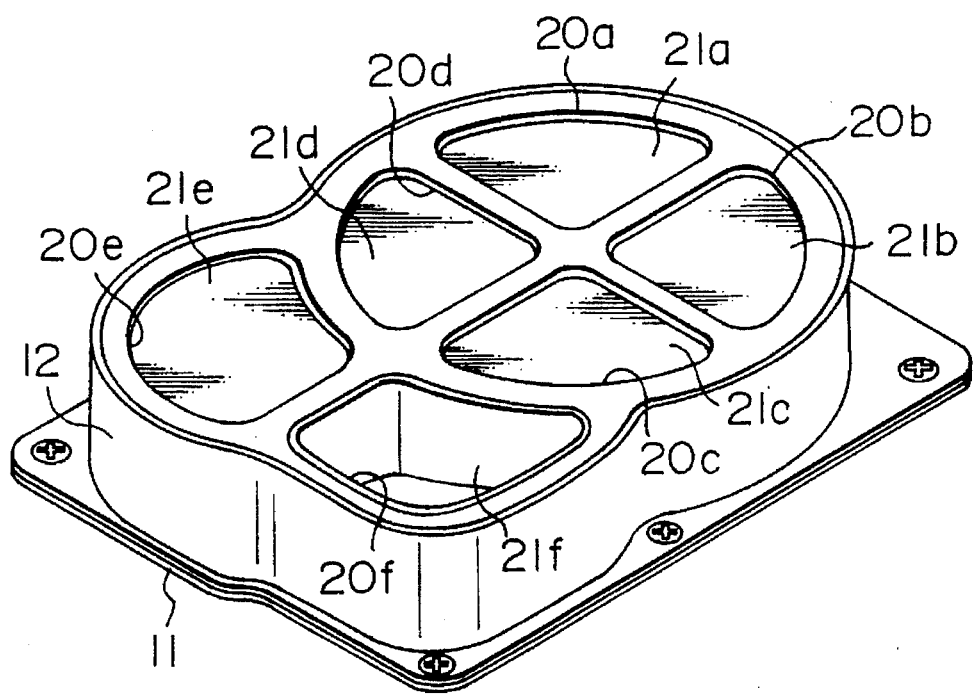
FIG. 15 is a perspective view showing a still moreover mounting state in the magnetic disk memory device of the present invention.

FIG. 15 shows a magnetic disk memory device according to a still further embodiment of the present invention. In the present embodiment, components incorporated in a housing are similar to those in the device shown in FIG. 1 but a cover 12 has a structure including the combination of beams such as lines and circular arcs or a so-called skeleton structure and is provided with many openings. For example, six openings exist between beams. The six openings include four sector-shaped openings 20a to 20d which have the same center as the rotation center of the disk in common and two openings 20e and 20f which are positioned above a head positioning mechanism. The openings 20a to 20d have the same form and the same size, and the openings 20e and 20f have the same form but different sizes. Each of shielding members 21a to 21d for the openings 20a to 20d is made by a flat thin plate. The shielding member is arranged inside of the cover 12 so as to cover each opening and a region thereof positioned at the periphery of the opening is bound to the cover 12. Similarly, the shielding member 21e for one 20e of the two remaining openings 20e and 20f includes a flat thin plate and is arranged inside of the cover 12 so as to cover each opening and a portion of the shielding member 21e positioned at the periphery of the opening is bound to the cover 12. But, an opening 21f for the other opening 20f includes a synthetic resin molding having a shallow box form which is provided with a flange portion at an opened end. The shielding member 21f is fitted into the opening 20f from the exterior so as to cover the opening 20f and a peripheral portion of the shielding member 21f is fixed to the cover 12 by use of an adhesive agent. A printed wiring board (not shown) is placed on the cover 12 so that electronic parts mounted on the printed wiring board fall in all or a part of the openings. The printed board is fixed to the cover 12.

With such a magnetic disk memory device, since all or a part of electronic parts mounted on the printed wiring board enter into the openings 20a to 20f provided in the cover 12, it is possible to reduce a distance between the printed wiring board and the cover 12, thereby reduce the thickness t of the whole of the device. Even if only the specification of electric circuits in the printed wiring board is changed, that is, even if the kind, arrangement and size of electronic parts mounted on the printed wiring board are changed, it is easy to accommodate each electronic parts in one of the many openings 20a to 20f. Therefore, it is possible to easily cope with a change in specification without increasing the thickness t of the whole of the device. Further, since the openings 20a to 20d have the same form and the openings 20e and 20f have the same form, the shielding members 21a to 21d can be used in common for each set of openings. Therefore, it is possible to reduce the number of shielding members, thereby reducing the cost. Also, since the shielding members 21a to 21f are made of a synthetic resin and therefore exhibit electrical insulation, no insulating treatment is required, thereby facilitating an assembling work. Further, since the respective shielding members 21a to 21f for the openings 20a to 20f are independent from each other, the sealing or closing of the housing 10 can be made surely and simply when a high degree of sealing is strongly required.

Figure 16:
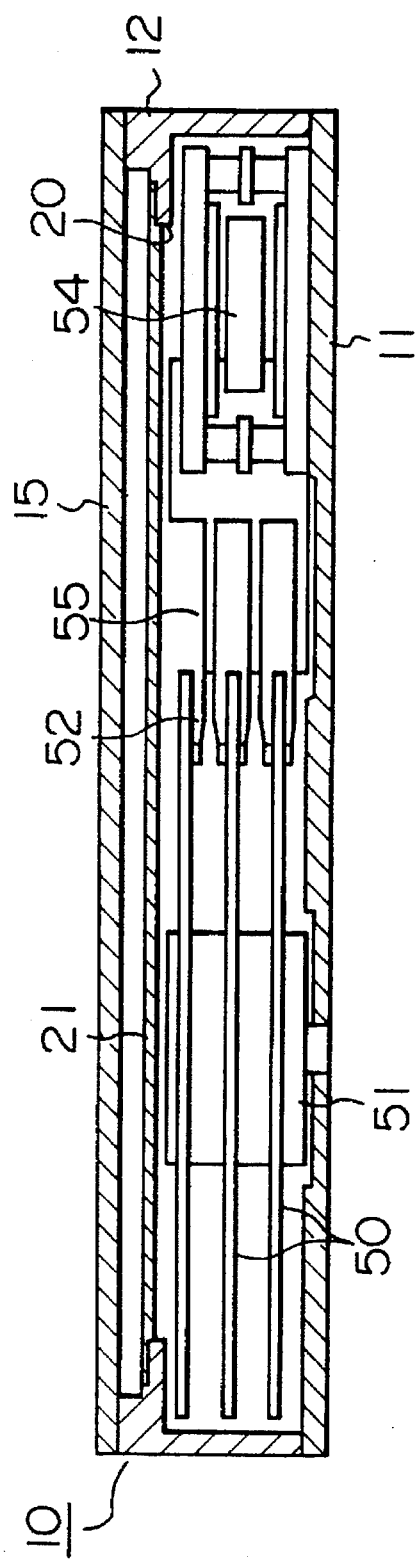
FIG. 16 is a cross section showing a different mounting state in the magnetic disk memory device of the present invention.

FIG. 16 shows a magnetic disk memory device according to a furthermore embodiment of the present invention. In the magnetic disk memory device of the present embodiment, one large opening is provided in a cover forming a housing so that a main part of components accommodated in a housing or electronic parts mounted on a printed wiring board arranged outside of the housing are received in this opening. In the housing 10 are incorporated a magnetic disk 50, a spindle motor 51 for supporting and rotating the magnetic disk, a head assembly 52, a swing arm 55 for supporting the head assembly and causing the movement of the head assembly on the magnetic disk, a voice coil motor 54 for swinging the swing arm, and so forth. A cover 12 is provided with a large opening 20 into which a main part of those components incorporated in the housing 10, for example, the spindle motor 51, the swing motor 55 and so forth enter. One shielding member 21 is arranged so as to cover the opening 20 and is fixed to the cover 12. A printed wiring board 15 is arranged outside of the shielding member 21 and is fixed to the cover 12.

Figure 17:
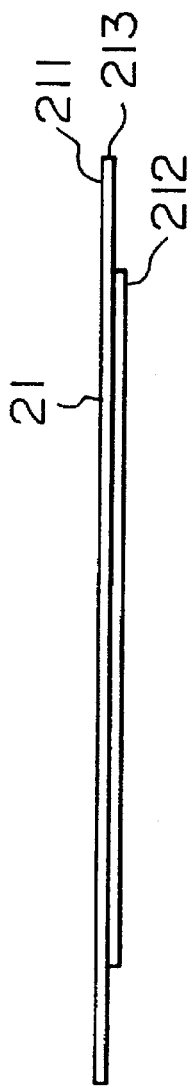
FIG. 17 is a side view of a shielding member 21 in the device shown in FIG. 12.

With such a magnetic disk memory device, when the device is made small in size and the mechanical strength of the shielding member is sufficient in a region covering the main part of components accommodated in the housing of the magnetic disk memory device, the thickness t of the whole of the device can be reduced since the main part of components accommodated in the housing 10 enter into the opening 20 and the opening 20 is sealed by only one shielding member 21. Also, since only one shielding member 21 is used, it is possible to easily carry out the assemblage notwithstanding that the size is reduced. Further, as shown in FIG. 17, if the shielding member 21 is constructed to shield noises generated from the printed wiring board 15, for example, if the shielding member 21 has a structure in which it includes the lamination of an electrical insulating film 211 and an electrically conductive plate 212 with an adhesive agent 213 interposed therebetween, the conductive plate 212 is positioned in the opening 20 and is fixed to the cover 12 by the adhesive agent provided at the periphery of the insulating film 211, it is possible to eliminate the influence of noises which may be generated from the conductive plate 212 to circuits of the printed wiring board 15 provided for the components accommodated in the housing.

With a magnetic disk memory device according to the present invention, it is possible not only to further reduce the thickness of the device but also to flexibly cope with a change in specification, thereby reducing the fabrication cost and the assembly cost.

We claim:

1. A magnetic disk memory device comprising:

a spindle motor for rotatably holding a magnetic disk medium for storing information therein;

head positioning mechanism for moving a magnetic head to a desired position on said magnetic disk medium for recording/reproduction of information into/from said magnetic disk medium;

a housing for accommodating said spindle motor and said head positioning mechanism therein;

at least one printed board mounted on the outer side of said housing, said printed board having circuit parts placed thereon for controlling said spindle motor and said head positioning mechanism and effecting the recording/reproduction by said magnetic head; and a stepped region provided on a surface of said housing arranged opposing said printed board, said stepped region having a level difference from the opposing surface of said housing so that at least a part of a constituent element in the magnetic disk memory device is received in a space defined by said stepped region, said stepped region including an opening which passes through the opposing surface of said housing to define at least a side portion of said stepped region and a shielding member which covers said opening and is shaped into a cup form to form the bottom portion and the side portion of said stepped region for preventing dust from entering into said housing.

2. A magnetic disk memory device according to claim 1, wherein said shielding member has a form conformable to said opening, and a portion of said shielding member forming the bottom portion of said stepped region is formed corresponding to the constituent element in the magnetic disk memory device.

3. A magnetic disk memory device according to claim 2, wherein said shielding member has an electrical insulating layer on a surface thereof opposing said printed board.

4. A magnetic disk memory device according to claim 3, wherein said shielding member includes an electrically conductive material.

5. A magnetic disk memory device according to claim 1, wherein one of said stepped regions provided in said housing projects to the printed board side so that an end portion of said spindle motor is arranged in a space formed by said stepped region.

6. A magnetic disk memory device according to claim 5, wherein a surface of said stepped region opposing said printed board has an electrical insulating layer.

7. A magnetic disk memory device according to claim 1, wherein said shielding member is coupled in said housing to a cushioning member to absorb the vibration of the constituent element in said housing.

8. A magnetic disk memory device according to claim 1, wherein an electrical insulating member is arranged between said housing and said printed board, and said shielding member has an electrical insulating layer on a surface thereof opposing said printed board.

9. A magnetic disk memory device according to claim 1, wherein an electrical insulating member is arranged between said housing and said printed board, and said shielding member includes an organic resin.

10. A magnetic disk memory device comprising:

a spindle motor for rotatably holding a magnetic disk medium for storing information therein;

head positioning mechanism for moving a magnetic head to a desired position on said magnetic disk medium for recording/reproduction of information into/from said magnetic disk medium;

a housing for accommodating said spindle motor and said head positioning mechanism therein;

a printed board mounted on the outer side of said housing, said printed board having circuit parts placed thereon for controlling said spindle motor and said head positioning mechanism or effecting the recording/reproduction by said magnetic head; and a structure supporting portion and a stepped region provided on a surface of said housing arranged opposing said printed board, said structure supporting portion fixing at least a rotation axis provided in said spindle motor or said head positioning mechanism, said stepped region having a level difference from the opposing surface of said housing so that a part of a constituent element in the magnetic disk memory device is received in a space defined by said stepped region, said stepped region including an opening which passes through the opposing surface of said housing to define at least a side portion of said stepped region and a shielding member which covers said opening and is shaped into a cup form to form the bottom portion and the side portion of said stepped region for preventing dust from entering into said housing.

11. A magnetic disk memory device according to claim 10, wherein said shielding member has a form conformable to said opening, and a portion of said shielding member forming the bottom portion of said stepped region is formed corresponding to the constituent element in the magnetic disk memory device.

12. A magnetic disk memory device according to claim 11, wherein said shielding member has an electrical insulating layer on a surface thereof opposing said printed board.

13. A magnetic disk memory device according to claim 12, wherein said shielding member includes an electrically conductive material.

14. A magnetic disk memory device according to claim 10, wherein said shielding member is coupled in said housing to a cushioning member to absorb the vibration of the constituent element in said housing.

15. A magnetic disk memory device according to claim 10, wherein an electrical insulating member is arranged between said housing and said printed board, and said shielding member has an electrical insulating layer on a surface thereof opposing said printed board.

16. A magnetic disk memory device according to claim 10, wherein an electrical insulating member is arranged between said housing and said printed board, and said shielding member includes an organic resin.

17. A magnetic disk memory device comprising a closed housing, components accommodated in said housing and including a disk driving mechanism which supports and rotates a disk as a magnetic storage medium and a positioning mechanism which supports a head for reading information from said disk and causes said head to move on said disk so that said head is moved to any position on said disk in cooperation with the rotation of said disk, and components arranged outside of said housing including a wiring board which has electric circuits for said disk driving mechanism and said positioning mechanism, in which said housing has at least one stepped opening, at least one shielding member is arranged on one side of said opening to close said housing, and a part of at least one of said components arranged outside of said housing is received in a space formed by said opening and said shielding member, wherein the shielding member covers said opening and is shaped into a cup form to form the bottom portion and the side portion of said stepped region.

18. A magnetic disk memory device according to claim 17, wherein said opening is provided in said housing at a position corresponding to a component fixedly arranged in said housing and cooperates with said shielding member to form a space opened for the interior of said housing so that a part of the component fixedly arranged in said housing is received in said space.

19. A magnetic disk memory device according to claim 17, wherein said opening is provided in said housing at a position corresponding to a component fixedly arranged outside of said housing and cooperates with said shielding member to form a space opened for the exterior of said housing so that a part of the component fixedly arranged outside of said housing is received in said space.

20. A magnetic disk memory device according to claim 17, wherein said opening is provided in said housing at a position corresponding to a space of said housing which is not occupied by the components accommodated in said housing, said opening cooperating with said shielding member to form a space opened for the exterior of said housing, and the components arranged outside of said housing are partially modified in accordance with said space so that the modified portion is received in said space.

* * * * *

UNITED STATES PATENT AND TRADEMARK OFFICE
CERTIFICATE OF CORRECTION

PATENT NO. : 5,650,895
DATED : Jul. 22, 1997
INVENTOR(S) : Yuichi Koizumi et al

It is certified that error appears in the above-identified patent and that said Letters Patent is hereby corrected as shown below:

Column 14, line 54, delete "and"

Signed and Sealed this

Seventeenth Day of March, 1998

Attest:

BRUCE LEHMAN

*Attesting Officer*  *Commissioner of Patents and Trademarks*